March 1, 1960     G. B. LINDERMAN     2,927,218

PINHOLE DETECTOR

Filed Sept. 26, 1958

INVENTOR

GARRETT B. LINDERMAN

ATTORNEY

United States Patent Office 2,927,218
Patented Mar. 1, 1960

2,927,218

PINHOLE DETECTOR

Garrett B. Linderman, Washington, D.C., assignor to Linderman Engineering Company, Inc., a corporation of Maryland Application September 26, 1958, Serial No. 763,546

10 Claims. (Cl. 250—219)

This invention relates to a pinhole detector and is particularly concerned with the maintenance of an unobscured path for light which has penetrated the strip of material containing the pinholes.

In view of the very small openings that must be sensed in connection with the detection of pinholes in tin plate in accordance with the present day requirements, it has become necessary to overcome the adverse effects of dust accumulating in the light path between the metal strip under observation and the light sensitive device or devices employed to detect the imperfections. It is not feasible to locate a cleaning device between the moving metal strip and the light sensitive device since such a cleaning device would itself obscure the light path. Accordingly, it is among the objects of the present invention to provide a light transmitting body intermediate the metal strip under observation and the light sensitive device in such a way that the body can be moved out of the light path in accordance with a schedule that will assure the presence of clean portions thereof lying in the light path at all times.

The invention may be characterized as providing in combination with a pinhole detector providing a path to be traversed by a strip of material and having a light source and a light sensitive device substantially aligned on opposite sides of the path; a body of material interposed between the path and the light sensitive device capable of transmitting light from the source, and driving means for advancing the body relative to the light sensitive device to maintain a substantially unobscured path for light penetrating the strip. The body may be a transparent belt of an endless type and the driving means may advance it in a continuous manner. Cleaning means is preferably disposed adjacent opposite surfaces of the belt for removing foreign material therefrom. The belt may be provided with tensioning means so that it will lie in a predetermined plane in the light path, and guides disposed above the light sensitive device preferably receive opposite edges of the body or belt.

A more complete understanding of the invention will follow from a description of the accompanying drawings wherein.

Figure 3:
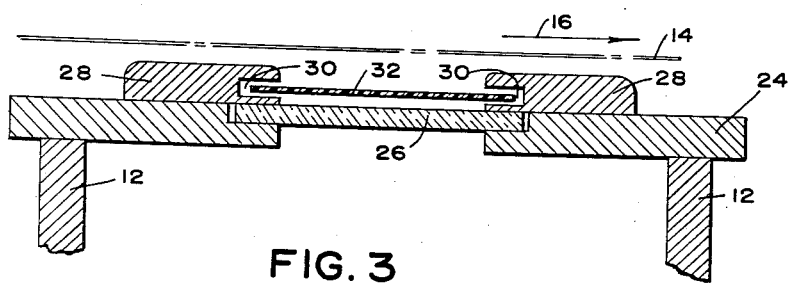
Fig. 3 is a fragmentary sectional elevation taken along line 3—3 of Fig. 1.

The pinhole detector depicted in the drawings comprises a light source housing 10 and a photosensitive device housing 12 disposed in spaced relationship on opposite sides of a path traversed by a strip of metal under observation. Such a strip of metal 14 has been depicted in broken lines in Fig. 3 where an arrow 16 indicates the direction in which it is moved. The photosensitive device housing 12 is mounted on a frame 18 by means of suitable brackets 20 and the frame supports the light source housing 10 by means of suitable brackets 22.

The upper wall 24 of the photosensitive device housing 12 receives a transparent insert 26 capable of transmitting light from the source 10 which passes through the pinholes in the metal strip 14 to the photosensitive device or devices, not shown, received in the housing 12. The structure described thus far is more or less conventional in the industry. It has been found that when any substantial amount of dust accumulates on the upper surface of the light transmitting insert 26, the relatively small amount of light penetrating a pinhole fails to reach the light sensitive device, with the result, that an imperfect sheet will be sold along with the prime sheets and possibly result in food spoilage or other damage to the material for which the sheet is ultimately used.

In order to eliminate this objectionable collection of dust in the light path, the upper wall 24 of the photosensitive device housing is provided with a pair of guides 28 having opposed grooves 30 to receive the opposite edges of a light transmitting body 32 which completely covers the light transmitting insert 26. By moving this light transmitting body 32 from time to time or continuously, according to the requirements of the dust conditions present, it will follow that clean portions of the body can be introduced into the light path as soiled portions are removed therefrom. As clearly shown in Fig. 1, this light transmitting body 32 may assume the form of an endless belt trained over sheaves 34 mounted by means of brackets 36 at the ends of the side walls 38 of the photosensitive device housing 12. At both ends of the photosensitive device housing 12, the belt 32 depends from the sheaves 34 and is trained around rollers 40 from which tensioning weights 42 are suspended to maintain the belt taut along its upper reach which is disposed in the light path. The belt 32 then extends upwardly from the rollers 40 over suitable sheaves 44 mounted in brackets 46 carried by the housing 12.

Figure 1:
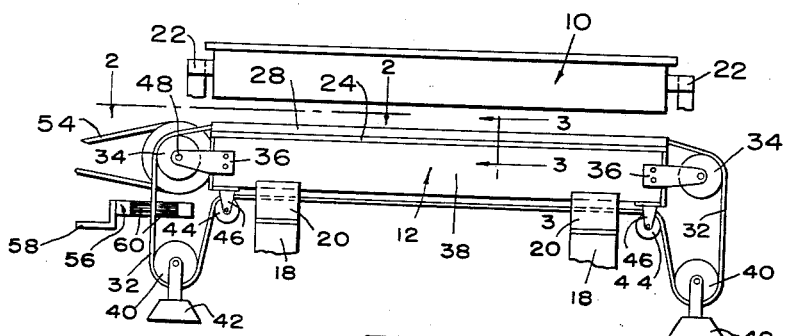
Fig. 1 is a somewhat schematic side elevation, partially broken away depicting a pinhole detector incorporating the present invention.

The shaft 48 of the sheave 34 disposed at the left end of the apparatus as depicted in Fig. 1, is journalled in bearings 50 provided by the brackets 36. One end of the shaft 48 receives a pulley 52 which may be driven by a belt 54 in accordance with any desired schedule adequate to maintain an unobscured belt area in the light path between the metal strip undergoing observation and the photosensitive device or devices in the housing 12.

Figures 2, 4:
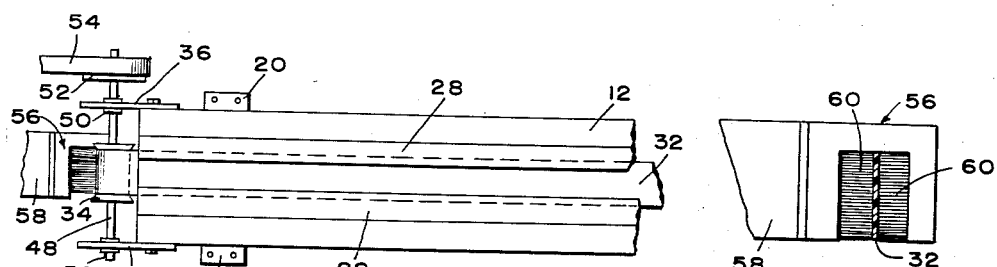
Fig. 2 is a fragmentary plan view taken along line 2—2 of Fig. 1.
Fig. 4 is a plan view of a suitable cleaning device taken along line 4—4 of Fig. 1.

Assuming movement of the belt 32 over the housing 12 to be from left to right as viewed in Fig. 1, a suitable cleaning device 56 could be disposed in the path of the belt at some point between the right end of the housing 12 where it leaves the light path and the left end of this housing where it reenters the light path. A suitable location for the cleaning device 56 has been depicted in Figs. 1 and 2 where a bracket 58 serves as a suitable support. A somewhat enlarged view of the cleaning device 56 appears in Fig. 4 where brushes 60 engage opposite surfaces of the belt to remove any dust which might have accumulated thereon. The nearer the brush or other suitable cleaning device is disposed to the point of reentry of the belt into the light path, the less danger there will be that dust will be deposited on the belt before it reenters the light path.

It will be clear that the direction of movement of the belt 32 can be reversed if desired and that cleaning devices assuming the form of brushes, compressed air or vacuum cleaners can be arranged at any desired number of points along the belt lying outside of the light path.

The light transmitting insert 26 may assume the form of a filter so as to be selective to light of desired wavelengths. The body 12 may also serve as an optical filter if desired, and assuming that it can be fitted to its guides 28 so as to exclude dust from the housing 12, the insert 26 can be omitted. Any of a number of plastic materials can be used to produce the body or belt 32 so that it will be uniformly light transmitting and flexible.

Whereas only one specific form of the invention has been described and illustrated, it will be clear to those skilled in the art that there are many modifications coming within the scope of the appended claims.

I claim:

1. In combination with a pinhole detector providing a path to be traversed by a strip of metal and having a light source and a light sensitive device substantially aligned on opposite sides of said path; a body of light transmitting material interposed between said path and said light sensitive device capable of transmitting light from said source, and driving means for advancing said body relative to said light sensitive device to maintain a substantially unobscured path for light penetrating said strip.

2. The invention as set forth in claim 1 wherein said body is a transparent belt.

3. The invention as set forth in claim 1 wherein said body is an endless belt.

4. The invention as set forth in claim 1 wherein said body is a belt and said driving means advances said belt continuously.

5. The invention as set forth in claim 1 wherein said body is an endless belt and cleaning means is disposed adjacent a surface of said belt for removing foreign material therefrom.

6. The invention as set forth in claim 1 wherein said body is an endless belt and cleaning means is disposed adjacent opposite surfaces of said belt for removing foreign material therefrom.

7. The invention as set forth in claim 1 wherein said body is a belt and said belt is provided with tensioning means.

8. The invention as set forth in claim 1 wherein said body is a belt and guides disposed above said light sensitive device receive opposite edges of said belt.

9. The invention as set forth in claim 1 including cleaning means for said body disposed adjacent thereto.

10. The invention as set forth in claim 9 wherein said cleaning means lies outside of said light path.

References Cited in the file of this patent

UNITED STATES PATENTS

| | | |
|---|---|---|
| 1,937,722 | Simon et al. | Dec. 5, 1933 |
| 2,758,712 | Linderman | Aug. 14, 1956 |
| 2,856,542 | McPheeters | Oct. 14, 1958 |

FOREIGN PATENTS

| | | |
|---|---|---|
| 694,507 | Great Britain | July 22, 1953 |